Patented Nov. 8, 1949

2,487,074

UNITED STATES PATENT OFFICE 2,487,074

COPPER SALTS OF MERCAPTANS AND THEIR USE IN COMPOUNDING SYNTHETIC RUBBER

Walter A. Schulze and Willie W. Crouch, Bartlesville, Okla., assignors to Phillips Petroleum Company, a corporation of Delaware No Drawing. Application September 26, 1944, Serial No. 555,887

7 Claims. (Cl. 260—79)

This invention relates to copper salts of mercaptans and their use in the compounding of synthetic rubber. In one of its more specific aspects, this invention relates to the compounding and vulcanization of a rubbery copolymer of a conjugated diolefin and styrene.

The present invention is concerned with the manufacture and use of oil-soluble copper salts of mercaptans, or cuprous mercaptides, conforming to the general formula CuSR, where R represents an alkyl radical. We have now found that the cuprous mercaptides of high molecular weight, having from 10 to 16 carbon atoms per molecule, are oil-soluble and are especially useful as vulcanization accelerators for GR–S. We have found that these may be prepared by reaction of a copper salt with a mercaptan or a mixture of mercaptans under specific reaction conditions.

The preparation of cuprous mercaptides by the interaction of an inorganic cupric salt with mercaptans according to the following equation is well known.

$$2CuSO_4 + 4RSH = 2CuSR + R-S-S-R + 2H_2SO_4$$

As a method of cuprous mercaptide preparation, the above system leaves much to be desired, since 50 mol per cent of the mercaptan is converted to the corresponding disulfide. In the aliphatic series, the prior art discloses mainly the oil-insoluble and unstable cuprous derivatives of relatively low molecular-weight primary and secondary mercaptans for which no useful applications have been recorded. We have now found that new and useful cuprous mercaptides can be prepared from mixtures of aliphatic tertiary mercaptans in the molecular weight range of about 170 to about 260 by reaction with inorganic cuprous salts under conditions described hereinafter.

An object of this invention is to provide as new chemical compounds, oil-soluble cuprous salts of mercaptans.

Another object of this invention is to provide a method of preparation of higher molecular weight cuprous salts of mercaptans.

Another object of this invention is to provide new materials for accelerating the vulcanization of synthetic rubber.

Still another object is to provide new materials useful for preparing germicides and insecticides.

A further object of this invention is to provide new materials useful in the preparation of coating compositions, paints, and the like.

It is also an object of this invention to provide new materials useful in the manufacture of greases, lubricants, and the like.

The manufacture of individual cuprous mercaptides of the tertiary mercaptans in our preferred molecular weight range is not economically feasible due to the non-availability of individual tertiary aliphatic mercaptans. The most abundant source of such tertiary mercaptans is from the catalytic addition of hydrogen sulfide to olefinic polymers of the specified carbon content. Such polymers are very complex mixtures and the mercaptans derived therefrom are equally complex, thus necessitating their use in the form of mixtures. Such mixtures may contain individual components ranging from $C_{10}$ to $C_{16}$ mercaptans but with a distribution such that average molecular weights of distillation fractions usually fall within the range of about 170 to 260. Mercaptan fractions of variable boiling range within the above limits may be employed in the preparation of our cuprous mercaptides. One of the preferred mercaptan stocks for the preparation of our copper mercaptide composition has a boiling range of about 75° C. to 105° C. at 5 mm. pressure, an average molecular weight of about 192 to 198 and a density of about 0.871. Such a mercaptan fraction as prepared from a catalytic heavy olefinic polymer and hydrogen sulfide in the presence of a silica-alumina catalyst has about 99 per cent of its mercaptans in the tertiary modification.

The cuprous mercaptide composition is prepared by the interaction of an inorganic cuprous salt and a mercaptan fraction selected in accordance with the limits hereinbefore described. Since our cuprous mercaptide product is soluble in most hydrocarbon solvents, its preparation is advantageously accomplished in the presence of such a solvent whereby operational difficulties inherent in a precipitation reaction are obviated. A suitable solvent may comprise any normally liquid hydrocarbon; however, benzene is often preferred because of its high solvent power toward the mercaptides and its ease of recovery. In order to effect the preparation of our composition by liquid-liquid contacting of homogeneous liquid phases, aqueous solutions of the inorganic cuprous salts are employed. Cuprous chloride is the inorganic salt of choice because of availability and general economic considerations. The said aqueous solutions are prepared with the aid of solubilizers such as alkali chlorides, ammonium chloride, ammonium hydroxide, buffered hydrochloric acid and the like.

The general technique employed in producing the cuprous mercaptide compositions comprises thorough commingling of a hydrocarbon-mercaptan solution with an aqueous solution of an inorganic cuprous salt, separation of the aqueous and non-aqueous phases and recovery of cuprous mercaptides from the non-aqueous phase. In a more specific embodiment, a benzene solution of a tertiary mercaptan fraction selected so as to fall within the molecular weight range of 170-260 is agitated with an aqueous cuprous chloride solution in the presence of a non-oxidizing atmosphere. The resultant benzene solution is mechanically separated, washed and is then added with stirring to a solvent selected from a group miscible with benzene but not with the cuprous mercaptide composition. The precipitated copper-containing product may be recovered by conventional means as a crystalline or amorphous solid. Precipitation solvents are ordinarily selected from the lower molecular-weight alcohols and ketones with methyl, ethyl and propyl alcohols being preferred. It is not intended that the above precipitation technique be mandatory, since extractive and evaporative means are often advantageously employed in recovering the reaction product from the solvent.

By virtue of its high metal content, storage stability and its solubility in oils, fats, waxes and the common organic solvents, we have found that the present cuprous mercaptide composition has a wide variety of useful applications. Thus, the mercaptide composition may be employed alone or in admixture with other material as germicides, fungicides and insecticides. Solutions of our cuprous mercaptides in oil, paint or similar vehicles are suitable for use as wood preservatives and other protective coatings. Because of its high metal content, the present composition is of value in the manufacture of grease and specially lubricants.

Outstanding, however, among the uses of this composition is its employment as an accelerator in the vulcanization of natural and synthetic rubber. The synthetic rubbers include polymers of olefins, diolefins, and halogenated derivatives thereof, as well as copolymers of these materials with one another, with unsaturated ketones, styrene, acrylic acid, methacrylic acid, and the nitriles and esters of said acids. The cuprous mercaptides of this invention are particularly useful in the compounding of GR-S, a copolymer of 1,3-butadiene and styrene. We have found that our preferred cuprous mercaptide composition exerts a marked acceleration effect in the vulcanization of GR-S and other types of synthetic rubber. Thus, in standard GR-S formulations containing mercaptobenzothiazole as the primary accelerator, small quantities of the present composition, ranging from 0.05 to 0.15 parts per 100 parts of GR-S polymer, show a definite cure activating effect. Further evidence of this unusual activating effect is revealed in the use of the mercaptide composition in conjunction with ultra-accelerators of the ethyl zimate type in GR-S vulcanization. With this latter combination faster curing results and at the same time a product of improved modulus and tensile strength is produced. Of exceptional advantage is the fact that normal rates of cure of GR-S formulas can be realized with the quantity of primary accelerator reduced to one-tenth of its ordinary value providing as little as 0.15 part of the present cuprous mercaptide composition is employed in the vulcanization mixture. Thus it is apparent that the composition as hereinbefore described may be used either as a primary or secondary accelerator.

The following examples are submitted by way of illustrating specific methods of practicing the present invention.

Example I

A batch of tertiary cuprous mercaptides was prepared from a fraction of tertiary aliphatic mercaptans having a boiling range of 75° to 105° C. at 5 mm. pressure according to the following procedure. A solution of 30 g. of the above mercaptan fraction in 90 cc. of benzene is added with stirring to a solution consisting of 400 cc. of water, 80 g. of sodium chloride and 15 g. of cuprous chloride (assay 85% minimum). After 15 minutes of agitation, the phases are separated and the hydrocarbon layer is washed with water. Addition of the washed solution dropwise to 500 cc. of methanol results in the precipitation of a bright yellow crystalline salt. Analysis of the dry salt showed a copper content of 29.3 per cent by weight. This material is somewhat soluble in pentane and higher homologous aliphatic hydrocarbons as well as in aromatic hydrocarbons.

Example II

A cuprous mercaptide composition was prepared as described in Example I with the exception that the cuprous chloride (20 g.) is dissolved in a solution of 200 cc. of concentrated ammonium hydroxide in 400 cc. of water. The product in this instance is an amorphous solid which on analysis was found to have a copper content of 24.0 per cent by weight.

Example III

Cuprous mercaptides were prepared as in Example I except that the cuprous chloride solution is buffered with 20 g. of sodium acetate. The product in this case is an amorphous solid with a cuprous copper content of 25.8 per cent by weight.

Example IV

The cuprous mercaptide compositions as described in the preceding examples were employed as accelerator activators in the vulcanization of GR-S crude polymer. The base formulation was as follows:

| | Parts |
|---|---|
| GR-S | 100.0 |
| ZnO | 3.0 |
| Paraflux | 4.0 |
| Bardol B | 4.0 |
| Wyex | 50.0 |
| Sulfur | 1.75 |
| Captax | 1.50 |

Paraflux is a stable, saturated, polymerized hydrocarbon having a specific gravity of about 1.03 and which is a viscous, dark liquid. Bardol B is a yellowish liquid, refined, coal-tar distillate having a naphthalene-like odor and a specific gravity of 1.00 to 1.04. Wyex is a channel carbon black. Captax is mercaptobenzothiazole.

The above recipe, alone and with an added 0.15 part of ethyl zimate, was vulcanized to furnish a basis of comparison with the same formulation containing added cuprous mercaptide. In this specific instance, the cuprous mercaptide composition was evaluated in the presence of the above formula containing 0.15 parts ethyl zimate. In Table I, the Roman numerals heading the cuprous mercaptide data refer to the examples wherein the mercaptides are characterized.

TABLE I

*GR-S characteristics after 30 minute standard cure*

| Accelerators | None | Ethyl Zimate | Cuprous Mercaptides | | |
|---|---|---|---|---|---|
| | | | I | II | III |
| Accelerator quantity, parts | | 0.15 | 0.15 | 0.15 | 0.15 |
| Modulus @ 300% | 180 | 350 | 860 | 810 | 910 |
| Tensile | 500 | 1,370 | 2,680 | 2,210 | 2,440 |

In the absence of the cuprous mercaptides, the standard formulation both with and without ethyl zimate is obviously undercured in the 30 minute period. It was found that in order to approximate the results recorded for the cuprous mercaptide-containing formulas of Table I, it was necessary to extend the curing time to 90 minutes, thus emphasizing the accelerating and/or activating effect of our preferred composition. Table II presents further data on the GR-S base formulas.

TABLE II

*GR-S characteristics after 90 minute standard cure*

| | Base Formula | Base Formula+0.15 Part Et Zimate |
|---|---|---|
| Modulus @ 300% | 630 | 1,000 |
| Tensile | 1,970 | 2,360 |

From Tables I and II it is apparent that the use of the present cuprous mercaptides as vulcanization accelerators results in a reduction of curing time of 66 to 67 per cent with the production of a finished vulcanizate of equal or superior properties.

Having now described our invention with the inclusion of certain specific embodiments, it will be apparent to those skilled in the art that many variations and modifications may be practiced without departing from the scope of the disclosure.

We claim:

1. An improvement according to claim 2 wherein the conjugated diolefin is butadiene and the cuprous salt is cuprous chloride.

2. In the preparation of a synthetic rubber product from a rubbery copolymer of a conjugated diolefin and styrene, the improvement which comprises compounding said rubbery copolymer with an oil-soluble reaction product of an inorganic cuprous salt and a tertiary aliphatic mercaptan fraction having a molecular weight within the range of 170 to 260 and containing mercaptans having 10 to 16 carbon atoms per molecule, in a quantity of 0.05 to 0.15 part of reaction product per 100 parts of copolymer sufficient to accelerate sulfur vulcanization of said copolymer.

3. An improvement according to claim 2 wherein the mercaptan fraction has a boiling point of 75 to 105° C. at 5 mm. pressure, a molecular weight of 192 to 198 and a density of 0.871.

4. A composition comprising a rubbery copolymer of a conjugated diolefin and styrene and an oil soluble reaction product of an inorganic cuprous salt and a tertiary aliphatic mercaptan fraction having a molecular weight within the range of 170 to 260 and containing mercaptans having 10 to 16 carbon atoms per molecule, in a quantity of 0.05 to 0.15 part of reaction product per 100 parts of copolymer sufficient to accelerate sulfur vulcanization of said copolymer.

5. A composition according to claim 4 wherein the conjugated diolefin is butadiene.

6. The method of accelerating the vulcanization of a synthetic rubber product of a rubbery copolymer of a conjugated diolefin and styrene which comprises adding to the synthetic rubber mix before vulcanization from 0.05 to 0.15 per cent by weight of an oil-soluble mercaptide reaction product of an inorganic cuprous salt and a fraction of tertiary aliphatic mercaptans containing from 10 to 16 carbon atoms per molecule and having a molecular weight of 170 to 260 as a sulfur vulcanization accelerator, and vulcanizing the resulting mixture.

7. The product of sulfur vulcanization of a rubbery copolymer of a conjugated diolefin and styrene containing from 0.05 to 0.15 per cent by weight based on the copolymer of an oil-soluble mercaptide reaction product of an inorganic cuprous salt and a fraction of tertiary aliphaitc mercaptans containing from 10 to 16 carbon atoms per molecule and having a molecular weight of 170 to 260.

WALTER A. SCHULZE.
WILLIE W. CROUCH.

REFERENCES CITED

The following references are of record in the file of this patent:

UNITED STATES PATENTS

| Number | Name | Date |
|---|---|---|
| 2,313,945 | Kellog et al. | Mar. 16, 1943 |
| 2,342,099 | Ashley et al. | Feb. 22, 1944 |
| 2,399,948 | Somerville | May 7, 1946 |
| 2,399,949 | Somerville | May 7, 1946 |